This invention relates to a new method for growing crystals of pure calcite. More specifically, the invention comprises a method of precipitating crystals of pure calcite (or calcite containing intentional dopants) from a melt containing calcium carbonate (and the desired dopant) and one or more molten salts or other suitable flux materials.

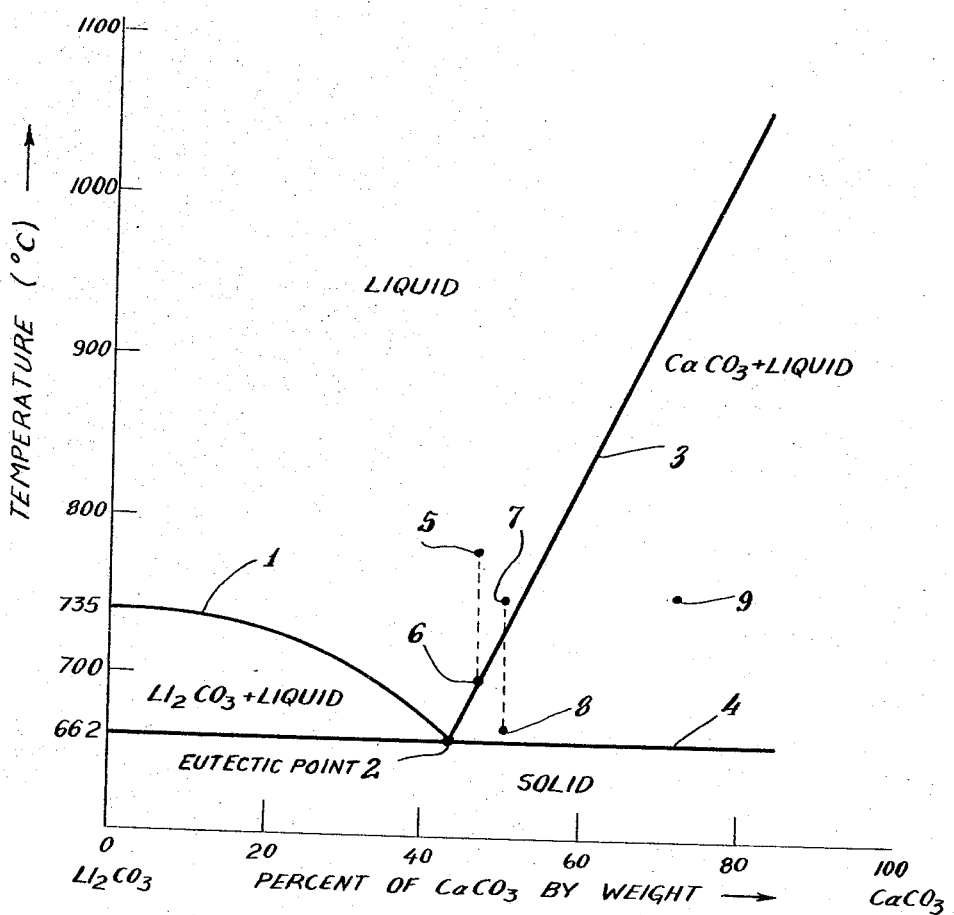
INVENTORS.
James F. Nester
John B. Schroeder
ATTORNEY 3,345,141
GROWTH OF CALCITE CRYSTALS FROM A
MOLTEN FLUX BY SLOW COOLING
James F. Nester, Ridgefield, and John B. Schroeder,
Weston, Conn., assignors to The Perkin-Elmer Corporation, Norwalk, Conn., a corporation of New York
Filed Nov. 7, 1963, Ser. No. 322,143
13 Claims. (Cl. 23—300)

Calcite is a naturally occurring crystalline form of calcium carbonate, which has well-known useful optical properties. Because of its marked birefringence, it has long been used for optical elements in which this quality may be advantageously exploited (for example, in the well-known polarizing Nichol prism). Naturally occurring calcite of great purity has gradually become more difficult to obtain as great use has been made of this material in relatively recent years. In addition, natural calcite of extreme purity (or with the presence of only particular, desirable other constituents), which may be utilized in lasers and other modern solid state devices, is almost impossible to find.

Although some attempts to grow artificial calcite crystals have been made, no one has been able to successfully grow crystals of even moderate size, nor have such previous attempts led to any methods particularly adaptable to commercial utilization. The main reason for the difficulty of artificially growing calcite is the fact that it will decompose into calcium oxide and carbon dioxide at a temperature (approximately 800° C.) at atmospheric pressure, which is well below its melting point of 1339° C. As may be seen from the published (see the F. Smythe and L. Adams article in the Journal of the American Chemical Society, volume 45, page 1178, of 1923) data of the vapor pressure of carbon dioxide over calcite at various temperatures, a pressure of approximately 102 atmospheres would have to be maintained in order to melt calcite without decomposition. In addition to the obvious problems encountered in such high pressure techniques, the crystalline form of calcium carbonate known as aragonite is favored at higher pressure. For this reason, no successful growth of calcite crystals by direct melting and cooling have been reported. Therefore, the crystals must be grown either from a solution, from a vapor or, as in the present invention, from a molten solution.

Use of the normal techniques for growth of crystals from aqueous solution (i.e., dissolving the material in water at a higher temperature and then slowly reducing the temperature so as to precipitate the desired material as a crystal or by allowing mass transport to occur because of a temperature gradient) are rendered extremely difficult by the low solubility of carbonate in water under normal conditions, namely, about $\frac{1}{100}$ gram per liter at 25° C. at atmospheric pressure. Therefore, extremely large volumes of dilute solutions are required for the cooling method, and extremely slow transport of material will occur with the mass transport method. Increasing of the ambient pressure can greatly increase the solubility of calcium carbonate in water, so that a hydrothermal process would appear to be feasible at first impression. However, operation at high pressures (and high temperature) tend to yield aragonite rather than calcite. Finally, attempts to form calcium carbonate chemically in an aqueous solution have lead to the production of extremely small crystals, because of the inherent difficulty in controlling the rate of formation of the calcium carbonate. Thus, the low solubility of calcium carbonate in water renders all of the aqueous growth techniques relatively unsuitable for the growth of large, optical quality calcite crystals.

Apparently no attempts to grow calcite by vapor methods have been made. Such methods require the use of volatile compounds or complexes of the material to be grown. The relative scarcity of such volatile calcium compounds and lack of suitable chemical reactions of these components to form calcium carbonate make such vapor methods relatively unattractive.

The present invention utilizes a technique different from all of those mentioned above. Specifically, this technique in the flux method of growing crystals. Such a process includes the dissolving of the material to be grown in a suitable molten salt (or other flux material) by heating the mixture to an elevated temperature. After equilibrium has been established, the mixture is slowly cooled so that the desired solute begins to crystalize from the solution because of its lower solubility at decreased temperatures. In a sense, such a flux technique is nothing more than non-aqueous solution growth.

A modification of this slow cooling flux technique is the gradient flux growth method. In this latter method an undissolved excess of the material to be grown is maintained in contact with the heated solution, for example, at the bottom of the crucible. The temperature of the saturated solution is maintained higher at the bottom than at the top, so that this temperaure gradient tends to dissolve the excess at the bottom while convection transports the dissolved material to the cooler region producing local super saturation. Introduction of a seed crystal (or a few such crystals) into this cooler region (before any spontaneous crystallization has occurred) will then cause a continuous growth upon the seed. This gradient technique has the advantage over the slow cool technique in that if yields crystals of a known size, quantity and crystalline habit, since crystal growth occurs only upon the seed and at a linear rate, which can be easily determined and controlled.

The present invention teaches how such flux growth methods may be utilized to grow calcite crystals. A single example of a preferred flux material successfully used and two flux growth methods (namely, slow cool and gradient) are hereinafter specifically described. Additionally, how to dope such crystals is described.

An object of the invention is the provision of methods for growing either pure optical quality calcite crystals or such crystals which include intentional doping with small quantities of desired additives.

Another object of the invention is the provision of methods for growing calcite crystals, which may be controlled as to the number and size of crystals grown.

A further object of the invention is the artificial growing of calcite crystals of sufficient size so as to be useful for the fabrication of optical and laser elements.

Other objects and advantages of the invention will be apparent to one skilled in the art upon reading the following specification in conjunction with the drawing in which: the sole figure is a graphical representation of the solubility curves of various mixtures of calcium carbonate and lithium carbonate at varying temperatures.

The present invention utilizes the flux growth techniques of the type previously mentioned to grow substantially pure calcite crystals. In order to be suitable as the flux, the material used to dissolve the calcium carbonate must have certain specific properties. First, it must dissolve calcium carbonate in appreciable quantities at temperatures below the decomposition temperature (800° C.). Secondly, it must not form any complexes with the calcium and carbonate ions either in the liquid or solid states. Thus, the flux material must not exhibit any solid solubility with calcium carbonate nor form any stable intermediate phases. Thirdly, the flux must not decompose the carbonate (i.e., acidic fluxes would not be acceptable). Finally, the flux must be thermodynamically stable at the temperature used in the growth process. One material which satisfies all of these requirements and has been successfully employed is lithium carbonate.

The sole drawing figure shows the phase diagram of lithium carbonate and calcium carbonate mixtures. The abscissa of this graph gives the percent of calcium carbonate present in the mixture by weight and the ordinate is the temperature in degrees centigrade. The curved solid line 1 at the lower left-hand part of the diagram separates the region of the graph at which mixtures containing smaller amounts of calcium carbonate will be wholly liquid (above line 1) from that region in which some solid lithium carbonate will be present (below line 1). Thus, the intersection of line 1 with the ordinate axis is merely the melting point of pure lithium carbonate (735° C.). As a gradually increasing amount of calcium carbonate is added to the lithium carbonate, the melting point of the mixture decreases along line 1 until it reaches point 2, which is the eutectic point. This eutectic mixture contains approximately 42 percent of calcium carbonate by weight and melts at a temperature of 662° C. The solid slanting line 3 separates those regions of the graph (which are relatively rich in calcium carbonate) as to whether such mixtures are wholly liquid (above and to the left of line 3) or contain some solid calcium carbonate (below and to the right of line 3). The horizontal straight line 4 through the eutectic point 2 separates those regions which contain both solid and liquid materials (above this line 4) from those regions which contain only solid materials (below this line).

If a liquid melt having more than 42 percent of calcium carbonate (by weight) is cooled so as to bring its temperature from, say, point 5 down to point 6 on the graph, further cooling will cause calcium carbonate to be crystallized out. This represents the type of cooling utilized in the invention. However, in order to increase the amount of liquid calcium carbonate crystallized without operating at temperatures too close to the decomposition temperature (800° C.), a point such as 7, having the coordinates of 750° C. and 50 weight percent, is chosen. Slowly cooling the liquid melt represented by this point 7 to point 8 (approximately 665° C.) will cause the crystallization of a substantial amount of the calcium carbonate in the solution. In particular, since the liquid at this temperature will contain only about 42 percent calcium carbonate by weight, approximately 8/50 or 16% of the originally present calcium carbonate will crystallize.

The first of the actual procedural steps utilized in a specific example of the invention is to heat an equal weight mixture of calcium carbonate and lithium carbonate in a gold crucible to 750° C. at atmospheric pressure. This melt is maintained at this temperature until it becomes completely homogeneous. The temperature is then slowly reduced (at a rate of no more than about 5° C. per hour) to 665° C. Since the rate of temperature reduction affects the size of the calcite crystals formed, it is preferable to utilize a very slow temperature reduction (about 1° C. per hour), in order to obtain large crystals. As the temperature gradually falls, the dotted vertical line connecting points 7 and 8 (which represents the decrease in temperature of this mixture) will cross line 3, at which point crystallization of calcite will commence. Further decreasing of the temperature will cause more and more calcium carbonate to crystallize out until the chosen end temperature (665° C.), which is represented graphically by point 8, is reached. The crucible is then quickly cooled to room temperature, so that the calcite crystals are embedded in a solid comprising the remaining calcium carbonate and lithium carbonate. The exact composition of this solid will depend on the end point used in the crystal growth process. In the above specific example, this solid material will be slightly richer in calcium carbonate than the eutectic mixture.

The exact proportion of the starting mixture may vary depending upon the starting temperature. Thus, this mixture may contain from about 45% to 60% calcium carbonate by weight. Below 45% the amount of calcium carbonate in excess of the eutectic mixture becomes so small that insufficient calcium carbonate is available to crystallize any substantial quantity of calcite as the temperature is reduced. Above 60% the mixture can not be made wholly liquid without exceeding the decomposition temperature (800° C.) of calcium carbonate. However, if the environment above the liquid is pressurized carbon dioxide, it is possible to start the cooling at temperatures somewhat in excess of 800° so as to allow concentration of calcium carbonate slightly above 60%.

An alternative method for growing calcite involves the use of the gradient growth flux technique. For example, a melt containing lithium carbonate and calcium carbonate is placed in a gold crucible and heated from below so that the material in the bottom of the crucible is maintained at about 750° C. The amount of calcium carbonate present is so chosen that it is well in excess of the proportion which will form a mixture that melts at this temperature. For this reason, solid calcium carbonate will be present at the bottom of the crucible. An example of such a mixture is represented by point 9 in the graph. The upper surface of the material in the crucible is maintained at a temperature of approximately 700° C. so that natural convection will cause the saturated liquid at the bottom of the crucible to rise to the top. At the temperature (700° C.) of the upper part of the crucible this mixture will be supersaturated with respect to calcium carbonate. Therefore, calcite will tend to form in the cooler top part of the melt. Formation of a single or a few large crystals may be encouraged by adding one or more seeds of calcite to this upper region before any spontaneous crystallization occurs. In this method also, the crucible and its contents may be quenched to room temperature after all the excess calcium carbonate has been transported from the bottom of the crucible to the crystals at the top.

In either of the above methods the calcite crystals can be easily separated from the solid flux material because of the high solubility of lithium carbonate and the low solubility of calcite in hot water. Thus, washing the contents of the crucible with hot water will free the calcite crystals from the solidified flux.

Although both of the above methods use lithium carbonate as the flux material for dissolving the calcium carbonate, other materials may be utilized. Thus, the flux may comprise a low melting mixture of potassium carbonate and lithium carbonate (e.g., 35 to 85 weight percent potassium carbonate). Pure potassium carbonate is unsatisfactory because its melting point is above the decomposition temperature of calcite. Although it is possible to overcome this problem by various methods, the simplest solution is merely to use lower melting mixtures (for example, the one just mentioned). Fluxes containing sodium tend to form high melting mixed salts with calcium carbonate and therefore should be avoided. This tendency is presumably due to the similar size of sodium and calcium ions (namely, 0.97 and 0.99 A. respectively). It has been found that hydroxides may not be used, since the melt will then decompose under the growth conditions, evolving carbon dioxide gas. In addition to the proven lithium carbonate flux and the somewhat analagous potassium carbonate and lithium carbonate mixture other flux materials which appear highly promising are lithium nitrate and the analagous combination of potassium nitrate and lithium carbonate. Other possible flux materials include calcium chloride and the various borates.

The above inventive flux growth methods offer several advantages over previously used techniques for growing calcite. They allow crystallization to occur at temperatures low enough so that no substantial amount of thermal decomposition of the calcium carbonate can occur. These new methods may be operated at normal atmospheric pressures in air; even when somewhat higher temperatures (i.e., about 800° C.) are utilized, relatively low pressure operation in an atmosphere of carbon dioxide may be used. Therefore, relatively large high quality calcite crystals may be grown in conventional furnaces utilizing moderate temperatures and atmospheric or slightly higher pressures.

Although the growth techniques specifically described have assumed that pure calcite was desired, it is possible to form calcite crystals including certain intentional additives or dopants. This may be accomplished in either of the flux growth methods previously described by adding to the melt small quantities of the desired dopant material, for example, metallic carbonates. In view of the fact that naturally occurring calcite may contain small quantities of other metallic carbonates, it is obvious that these particular salts may be readily integrated into the calcite crystals. Thus any one of cadmium, cobalt, ferrous, zinc, nickel, magnesium or manganese carbonates (each of the metallic ions having a valence of two) may be included in the calcite in any desired percentage. It is also likely that other dopants can be grown into the calcite crystals, the existence of a stable two-valent state and an ion size similar to calcium being properties which favor such substitution. Because of the ease in which the desired quantity of dopant may be integrally incorporated in calcite crystals, the disclosed flux growth techniques are particularly adaptable to forming any physically possible doping of the calcite.

Since materials other than the preferred lithium carbonate may be used as the flux, the invention is not limited to such material. Similarly, since various modifications and somewhat different ranges of both temperature and proportions of the flux constituents may be used other than those described in the specific embodiments and since various dopants may be added to the growth material, the invention is not limited to any of these specific proportions, temperatures or flux materials specifically described. On the contrary the invention is defined solely by the appended claims.

We claim:

1. A slow cool method of growing artificial calcite comprising:
    adding to a contained volume a mixture of calcium carbonate and a flux material capable of forming a eutectic mixture with calcium carbonate such that the lowest melting point of said mixture is the eutectic point, said flux being selected from the group consisting of lithium carbonate, lithium nitrate, calcium chloride and a mixture of potassium carbonate with lithium carbonate in which said potassium carbonate comprises about 35 to 85% by weight thereof;
    said flux material being of such composition that some proportionate mixtures of calcium carbonate therewith have melting points below the decomposition temperature of calcium carbonate and above the solidus temperature of any intermediate phases which may form between the flux and calcium carbonate;
    said calcium carbonate being provided in said contained volume in a proportional amount in excess of that proportional mixture having the lowest melting point;
    heating said contained volume to and maintaining the temperature of said contained volume at a temperature which is above said lowest melting point and below the decomposition temperature of both the calcium carbonate and the flux, so that at least some liquid containing some calcium carbonate, is present in said volume;
    slowly cooling at a rate less than about 5° C. per hour a substantial part of said contained volume which includes a substantial part of said liquid to a temperature below the melting temperature but above the eutectic temperature of the particular proportional liquid mixture therein, so that said substantial part becomes slowly supersaturated with respect to calcium carbonate;
    thereby causing said supersaturated calcium carbonate to crystallize out in said part to form at least one calcite crystal.

2. The method according to claim 1, in which:
    said mixture of calcium carbonate and a flux material comprises between 45 and 60% by weight calcium carbonate with lithium carbonate.

3. The method according to claim 1, in which:
    said growing is accomplished in air; and said temperature to which the contained volume is heated and maintained is below 800° C. to prevent $CaCO_3$ decomposition.

4. The method according to claim 1, in which:
    said growing is accomplished in an atmosphere of carbon dioxide, so as to inhibit decomposition of said calcium carbonate.

5. The method according to claim 4, in which:
    said carbon dioxide is maintained at a pressure substantially in excess of one atmosphere.

6. The method according to claim 1, in which:
    a temperature gradient is maintained in the liquid melt to provide a hotter and colder region therein, maintaining excess solid $CaCO_3$ in said hotter region to ensure the liquid in said hotter region remains saturated with $CaCO_3$, slowly transporting by convection said saturated liquid from the hotter region through said temperature gradient to said colder region, whereby said transported liquid becomes supersaturated with respect to $CaCO_3$ causing crystallization and growth of calcite.

7. The method according to claim 6, in which:
    said colder region part is in the upper portion of said contained volume, so that heat convection currents cause slow transport of the saturated liquid from the hotter to the colder region.

8. The method according to claim 7, in which:
    the upper surface of said contained volume is in physical contact with a lower temperature external environment, so that said part is maintained at said lower temperature by direct heat loss to said external environment.

9. The method according to claim 6, in which:
    formation of calcite crystals in said part is assisted by adding at least one seed of calcite thereto.

10. A slow cool method of growing artificial calcite from a lithium carbonate flux comprising:
    adding to a contained volume a mixture constituting about 45 through 60% calcium carbonate and about 55 through 40% lithium carbonate by weight;
    maintaining said mixture in said contained volume at a first temperature, between about 700° C. and 800° C., until a substantially homogeneous, essentially liquid mixture is obtained;
    slowly reducing the temperature of at least a substantial part of said mixture at a rate of less than about 5° C. per hour to a second temperature, which is between 662° C. and about 700° C. and is substantially below said first temperature;
    thereby causing supersaturation of said mixture with respect to calcium carbonate and the formation of at least one calcite crystal.

11. The method of growing calcite according to claim 10, in which:
    said mixture originally contains substantially 50% each of calcium and lithium carbonate by weight; said first temperature is about 750° C.; and said second temperature is about 665° C.

12. A gradient growth method of forming calcite from a lithium carbonate flux comprising:
   forming a continuous body of a liquid mixture of 45 to 60% by weight calcium carbonate and lithium carbonate;
   maintaining a substantial temperature gradient therein between a hotter region kept at between about 700° C. and 800° C. and a cooler region kept at between 662° and about 700° C.;
   providing excess solid calcium carbonate in said hotter region so as to maintain the liquid therein saturated with respect to calcium carbonate;
   and causing at least some of said liquid saturated with calcium carbonate to be slowly convectively transported through said temperature gradient from said hotter region to said cooler region to obtain a cooling rate of the liquid of less than about 5° C. per hour, so that the liquid becomes slowly supersaturated with calcium carbonate thereby causing crystallization of at least one calcite crystal in said cooler region.

13. The gradient growth method of forming calcite according to claim 12, in which:
   the temperature of said hotter region is about 750° C.; and the temperature of said cooler region is about 700° C.

References Cited
UNITED STATES PATENTS

| | | | |
|---|---|---|---|
| 2,112,903 | 4/1938 | Booth | 23—66 |
| 2,112,904 | 4/1938 | Booth | 23—66 |
| 2,637,545 | 5/1953 | Hicquet | 23—66 X |
| 2,762,686 | 9/1956 | Cunningham | 23—66 |
| 2,865,781 | 12/1958 | Wainer | 23—66 X |

OTHER REFERENCES

Leek: An American Story of Precipitated Chalk, Industrial Chemical Sales Co., 1933, New York, pp. 6 and 14 to 16.

NORMAN YUDKOFF, *Primary Examiner.*

S. J. EMERY, *Assistant Examiner.*